United States Patent
Shen et al.

(10) Patent No.: US 9,226,051 B2
(45) Date of Patent: Dec. 29, 2015

(54) METHOD FOR OPTIMIZING OPTICAL NETWORK

(71) Applicant: Zhangjiagang Institute of Industrial Technologies Soochow University, Jiangsu (CN)

(72) Inventors: Gangxiang Shen, Jiangsu (CN); Yongcheng Li, Jiangsu (CN); Limei Peng, Jiangsu (CN)

(73) Assignee: SOOCHOW UNIVERSITY, Jiangsu (CN)

( * ) Notice: Subject to any disclaimer, the term of this patent is extended or adjusted under 35 U.S.C. 154(b) by 76 days.

(21) Appl. No.: 14/286,128

(22) Filed: May 23, 2014

(65) Prior Publication Data

US 2014/0348503 A1   Nov. 27, 2014

(30) Foreign Application Priority Data

May 27, 2013 (CN) .......................... 2013 1 0201627

(51) Int. Cl.
*G01R 31/08* (2006.01)
*H04Q 11/00* (2006.01)
*H04J 14/02* (2006.01)
*H04L 12/721* (2013.01)

(52) U.S. Cl.
CPC ........ *H04Q 11/0062* (2013.01); *H04J 14/0241* (2013.01); *H04L 45/62* (2013.01); *H04Q 2011/0086* (2013.01)

(58) Field of Classification Search
CPC ....................................................... H04B 10/20
USPC ................................ 370/220–465; 389/49–99
See application file for complete search history.

(56) References Cited

U.S. PATENT DOCUMENTS 7,609,966 B2 * 10/2009 Gumaste ............. H04J 14/0238
                                                              370/352

FOREIGN PATENT DOCUMENTS

CN           101808254 A      8/2010
KR     10-2005-0122214 A    12/2005

OTHER PUBLICATIONS

Office Action issued in corresponding Chinese Patent Application No. 201310201627.9 dated Jun. 1, 2015.
Li, Kun, "Study on Routing and wavelength assignment in the design of WDM optical network planning system" Master Dissertation, University of Electronic Science and Technology of China, China Academic Journal Electronic Publishing House, 2009.

* cited by examiner

*Primary Examiner* — Iqbal Zaidi
(74) *Attorney, Agent, or Firm* — Pearne & Gordon LLP

(57) ABSTRACT

A method for optimizing an optical network includes: obtaining a lightpath demand set including multiple lightpath demands; generating multiple lightpath demand sequences with different orders from the lightpath demand set; obtaining results of the respective lightpath demand sequences in parallel by multiple processing terminals; obtaining all the results, and comparing the results to obtain an optimum result. In this embodiment, by generating multiple lightpath demand sequences with different orders for the lightpath demand set and obtaining many results, the optimum result can be selected out from the results. Furthermore, multiple processing terminals may obtain the result in parallel, thus improving an operation efficiency.

6 Claims, 3 Drawing Sheets

METHOD FOR OPTIMIZING OPTICAL NETWORK

This application claims priority to Chinese Patent Application No. 201310201627.9, entitled "METHOD FOR OPTIMIZING OPTICAL NETWORK", filed with the State Intellectual Property Office on May 27, 2013, which is incorporated by reference in its entirety herein.

FIELD OF THE TECHNOLOGY

The present application relates to the field of communication, and in particular, to a method for optimizing an optical network.

BACKGROUND

Some problems, such as routing and wavelength assignment problem and sub-wavelength traffic grooming problem can be solved by improving a performance of an optical network with optical network optimization. The solutions of these two problems may both be considered as applications of bin-packing problem. The bin-packing problem is a classical combinatorial optimization problem, which is directed to find methods to pack all items with a minimal number of bins. In particular, taking the routing and wavelength assignment problem as an example, lightpaths indicate items, routing lengths of lightpath demands indicate volumes of the items, and each waveplane that is the copy of topology indicates a bin. In this case, the method for optimizing the optical network is to rank all lightpath demands based on a descending order of routing hop lengths of the lightpaths.

In existing technology, heuristic algorithm is generally applied to a demand sequence, when the foregoing bin-packing problem is solved by the method for optimizing optical network. In the research process, at least the following disadvantages in existing technology are found.

Because an order of lightpath demands in a lightpath demand sequence affects routing and wavelength assignment algorithm greatly, the heuristic algorithm operated once in existing technology can not guarantee to obtain an optimal result every time, thus deteriorating the effect of optical network optimization.

SUMMARY

In view of this, a method for optimizing an optical network is provided according to an embodiment of the application.

The embodiment of the application may be implemented as follows.

A method for optimizing an optical network includes:
obtaining a lightpath demand set including multiple lightpath demands;
generating multiple lightpath demand sequences with different orders from the lightpath demand set;
obtaining results of the respective lightpath demand sequences in parallel by multiple processing terminals; and
obtaining all the results, and comparing the results to obtain an optimum result.

Preferably, in an embodiment of the application, the obtaining results of the respective lightpath demand sequences, includes:
obtaining the results of the respective lightpath demand sequences in heuristic algorithm.

Preferably, in an embodiment of the application, the result includes the number of waveplanes to be expected.

Preferably, in an embodiment of the application, the obtaining the results of the respective lightpath demand sequences in heuristic algorithm, includes:
scanning waveplanes for each lightpath demand to determine whether there is a waveplane configured to accommodate the lightpath demand;
in the case that there is the waveplane configured to accommodate the lightpath demand request, establishing a connection by the waveplane determined at the first time;
in the case that there is no waveplane configured to accommodate the lightpath demand request, adding a new waveplane to accommodate the lightpath demand; and
after all the lightpath demands are accommodated, counting the total number of waveplanes to obtain the number of waveplanes to be expected.

Preferably, in an embodiment of the application, the generating multiple lightpath demand sequences with different orders from the lightpath demand set, includes:
obtaining the lightpath demand set by the multiple processing terminals;
generating, by the multiple processing terminals, the multiple lightpath demand sequences with different orders respectively from the lightpath demand set.

Preferably, in an embodiment of the application, the results of the respective lightpath demand sequences are obtained in parallel by multiple processing terminals on cloud computing platform.

Preferably, in an embodiment of the application, the method include: applying Hadoop system to the method for optimizing the optical network.

Preferably, in an embodiment of the application, the applying Hadoop system to the method for optimizing the optical network includes:
obtaining the lightpath demand set including multiple lightpath demands by the Hadoop system in Map step;
generating the multiple lightpath demand sequences with different orders from the lightpath demand set in Reduce step;
obtaining the results of the respective lightpath demand sequences in parallel by multiple processing terminals based on the Hadoop system; and
collecting all the results, and comparing all the results to obtain the optimum results by the Hadoop system.

According to the above technical solutions, in the embodiments of the application, multiple lightpath demand sequences with different orders are generated from the lightpath demand set, and multiple results are obtained, so as to obtain the optimum result from multiple results. Furthermore, in the embodiments of the applications, the results can be obtained in parallel by multiple processing terminals, thus implementing a high operation efficiency.

Thus, with technical solutions according to the embodiments of the application, an optimum result can be obtained timely in optical network optimization, and thus the optical network optimization is effectively improved.

BRIEF DESCRIPTION OF THE DRAWINGS

To better explain the technical solutions in the embodiments or in existing technology, drawings for description of the embodiments or existing technology are briefly described as following. Apparently, the drawings in following description are only some embodiments of the application. For those skilled in the art, other accompanying drawings may be obtained according to these accompanying drawings without any creative work

DETAILED DESCRIPTION OF EMBODIMENTS

Figure 1:
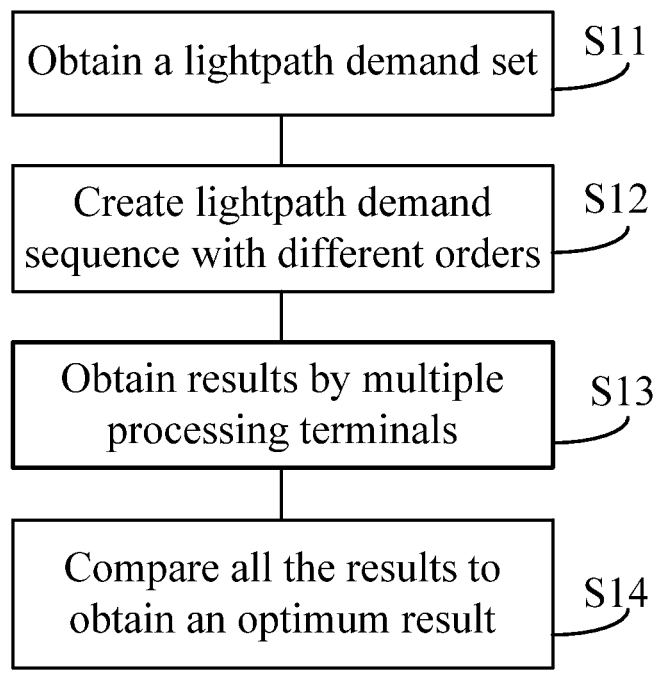
FIG. 1 is a step diagram of a method for optimizing an optical network according to an embodiment of the application.

The technical solutions according to embodiments of the application are clearly and completely described below combining with drawings of the embodiments. It is obvious that the embodiments described are not all of, instead only a part of all embodiments. All the other embodiments obtained by those skilled in the art based on the embodiments in the present disclosure without any creative work belong to the protection scope of the present disclosure To improve the effect of optical network optimization, a method for optimizing an optical network is provided according to an embodiment of the application. As shown in FIG. 1, the method includes steps S11-S14.

S11 includes: obtaining a lightpath demand set including multiple lightpath demands.

In a process of optical network optimization, there is combinatorial optimization problem, such as, routing and wavelength assignment problem and sub-wavelength traffic grooming problem in a design of a backbone network. These problems can be considered as bin-packing problems. Taking the routing and wavelength assignment problem as an example, lightpaths indicate items, routing lengths of lightpath demands indicate volumes of items, and each waveplane that is the copy of topology indicates a bin. In this case, the method for optimizing the optical network is directed to rank all lightpath demands based on a descending order of the routing hop lengths of the lightpaths.

In an implementation, the lightpath demand set including multiple lightpath demands may be obtained first, then the lightpath demands may be ranked and a calculation may be performed to the lightpath demands.

S12 includes: generating multiple lightpath demand sequences with different orders from the lightpath demand set.

In an implementation, a heuristic algorithm is generally applied to one demand sequence of the lightpath demand set to obtain a result, when the bin-packing problem is solved by the method for optimizing optical network. However, it is found in a research process that the result obtained from one demand sequence is usually not an optimal result. Therefore, in an embodiment of the application, multiple lightpath demand sequences with different orders are generated from the lightpath demand set. Thus, the optimum result can be selected out from the results of multiple lightpath demand sequences with the different orders.

S13 includes: obtaining results of the respective lightpath demand sequences in parallel by multiple processing terminals.

Due to a huge computing resource consumed by generating multiple lightpath demand sequences with different orders from the lightpath demand set, in an embodiment of the application, a distributed processing approach is used, in which multiple processing terminals cooperate to perform the calculations to improve the operation efficiency. Specifically, each processing terminal can operate a part of multiple lightpath demand sequences in heuristic algorithm to obtain the results. In particular, multiple processing terminals may cooperate to perform the calculations in a mode of cloud computing system.

S14 includes obtaining all the results, and comparing the results to obtain an optimum result.

Because many results may be obtained, comparing with existing technology there is a higher probability that the optimum result is contained in the many results obtained according to this application. Thus, the optimum result can be obtained by comparing all the results.

Therefore, in the embodiments, multiple lightpath demand sequences with different orders are generated from the lightpath demand set and many results are obtained. In this way, the optimum result may be selected out from many results. Furthermore, in an embodiment of the application, the result may be obtained in parallel by multiple processing terminals, thus improving the operation efficiency.

In this way, with the technical solutions according to the embodiments of the application, an optimum result can be obtained timely in optical network optimization, and thus the optical network optimization is effectively improved.

In an implementation, Hadoop system is applicable to the mode of cloud computing, which is realized by a distributed file system and MapReduce of Hadoop system. Taking a waveplane-based heuristic algorithm to solve the routing and wavelength assignment problem as example, the result may be the number of waveplanes to be expected.

Figure 2:
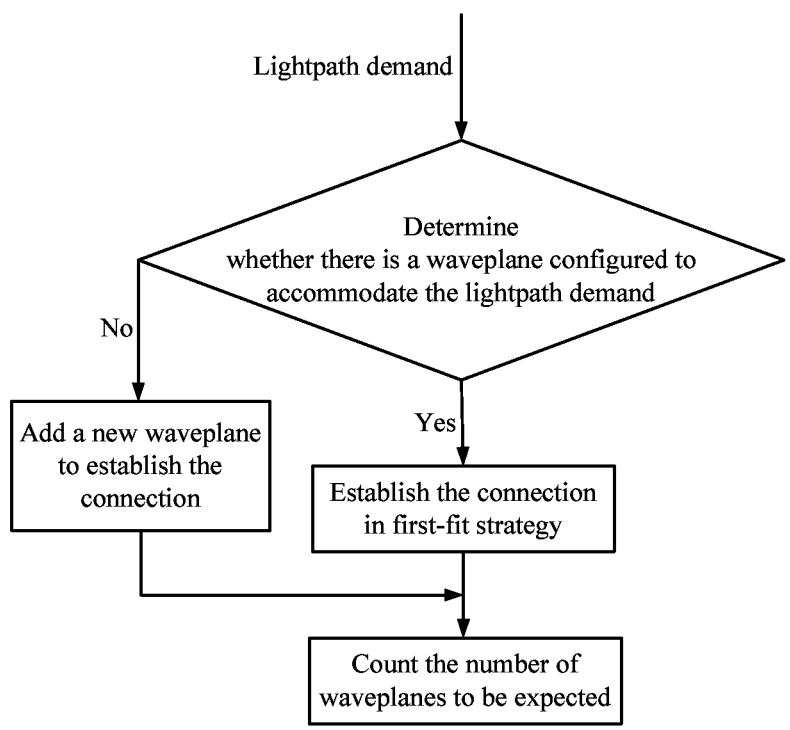
FIG. 2 is a flow chart of a method for calculating the number of waveplanes to be expected for a lightpath demand sequence according to an embodiment of the application.

As shown in FIG. 2, the step of counting the number of waveplanes to be expected for each lightpath demand sequence in heuristic algorithm may include:

scanning existing waveplanes for each lightpath demand, to determine whether there is a waveplane configured to accommodate the lightpath demand request;

in the case that there is the waveplane configured to accommodate the lightpath demand request, establishing a connection by using the waveplane determined at the first time (i.e., first-fit strategy);

in the case that there is no waveplane configured to accommodate the lightpath demand request, adding a new waveplane to accommodate the current lightpath demand; and after all the lightpath demands are accommodated, counting the total number of waveplanes to obtain the number of waveplanes to be expected.

In the algorithm to solve the routing and wavelength assignment problem in Hadoop system, multiple lightpath demand sequences are generated first by shuffling lightpath demand sequences. Then, heuristic wavelength routing algorithm is performed on the lightpath demands in each lightpath demand sequence to generate the results, i.e., the number of waveplanes to be expected.

The step of generating multiple lightpath demand sequences with different orders the lightpath demand set may include: obtaining, by the multiple processing terminals, the lightpath demand set; and generating, by the multiple processing terminals, the multiple lightpath demand sequences with different orders respectively from the lightpath demand set. In this way, the multiple processing terminals obtain the results in parallel, thus improving the operation efficiency.

After obtaining the number of waveplanes to be expected for each lightpath demand sequence, the method may include: comparing all the results to determining the best result as final solution. The optimum result can be selected out from many results by generating multiple lightpath demand sequences with different orders from the lightpath demand set and obtaining many results.

Figure 3:
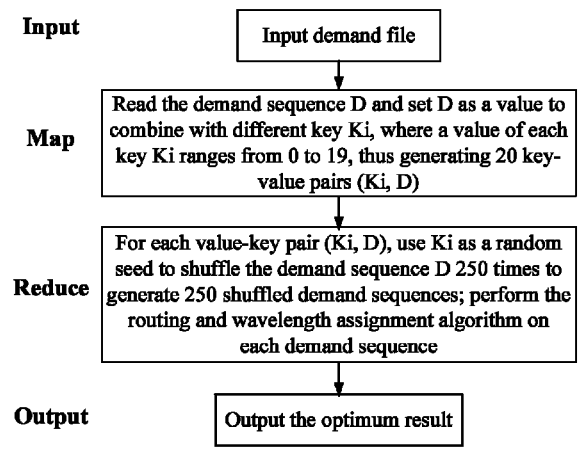
FIG. 3 is a flow chart of a method for optimizing an optical network according to an embodiment of the application, where a distributed file system is applied to the method.
Figure 4:
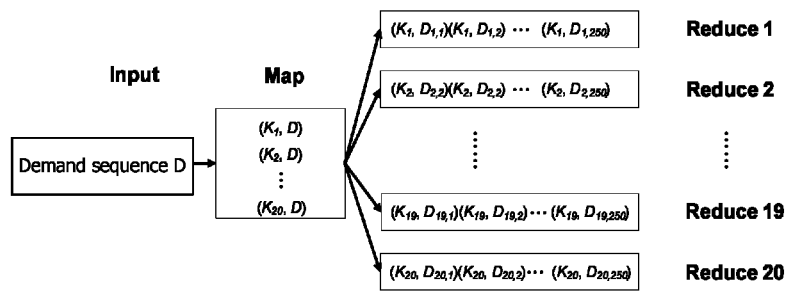
FIG. 4 is a flow chart of a method for optimizing an optical network according to another embodiment of the application, where a distributed file system is applied to the method.

In an implementation, as shown in FIG. 3, a distributed file system (HDSF) obtains an input file including a lightpath demand set. Second, a map function reads the file and sets the lightpath demand sequence D as a value to combine with different keys Ki, where a value of each key Ki ranges from 0 to 19. The key is used as a random seed in a Reduce function later. The Map function generates a total of 20 key-value pairs (Ki, D). Then, the key value pairs are forwarded to 20 Reduce functions to perform an operation in parallel. In each Reduce function and for each key-value pair (Ki, D), the lightpath demand sequence included in the value D is randomly shuffled 250 times with the associated key Ki as the random seed. The whole process is illustrated in FIG. 4. The heuristic routing and wavelength assignment algorithm is executed for each of the shuffled demand sequences to determine the number of wavelengths to be expected. Then, the results of 250 shuffled demand sequences are compared to determine the best result in each Reduce function. For the whole cloud computing system, the results of 20 Reduce functions are compared to find a global optimum. Thus, a total of 5000 (250×20) shuffled demand sequences are evaluated in the whole computation process to obtain the final best result. Those skilled in the art should understand that the increment of the number of evaluated demand sequences for a better performance may be implement by either increasing the number of demand sequences evaluated by each Reduce function or by increasing the number of Reduce functions, which will not limited by the embodiments.

In an embodiment of the application, considering a structure of the processing terminals of the cloud computing, the Hadoop cloud computing system to solve the routing and wavelength assignment problem includes ten desktops as the processing terminals, of which one functions as a Master and also as a Slave, the others function as Slaves. Two Reduce functions are set on each Slave, so totally 20 Reduce functions are configured in the whole system.

All embodiments in this specification are described herein in a progressive way. Each embodiment focuses on explaining the difference from other embodiments. The same or similar parts of different embodiments can be found by cross reference.

Foregoing descriptions of the disclosed embodiments enable those skilled in the art to realize or use this disclosure. Various modifications to these embodiments will be apparent to those skilled in this art, and the general principles can be realized in other embodiments without departing from the spirit or scope of this disclosure. Accordingly, this disclosure will not be limited to those embodiments shown herein, but to keep consistent with the widest range of the principles and novel features disclosed herein.

The invention claimed is:

1. A method for optimizing an optical network, comprising:

obtaining a lightpath demand set including a plurality of lightpath demands;
generating a plurality of lightpath demand sequences with different orders from the lightpath demand set;
obtaining results of respective lightpath demand sequences in parallel by a plurality of processing terminals in heuristic algorithm; and
obtaining all the results, and comparing the results to obtain an optimum result,
wherein the obtaining the results of the respective lightpath demand sequences in heuristic algorithm comprises:
scanning waveplanes for each lightpath demand to determine whether there is a waveplane configured to accommodate the lightpath demand;
in a case that there is the waveplane configured to accommodate a lightpath demand request, establishing a connection by the waveplane determined at the first time;
in the case that there is no waveplane configured to accommodate the lightpath demand request, adding a new waveplane to accommodate the lightpath demand; and
after all the lightpath demands are accommodated, counting a total number of waveplanes to obtain a number of waveplanes to be expected.

2. The method for optimizing the optical network according to claim 1, wherein the result includes the number of waveplanes to be expected.

3. The method for optimizing the optical network according to claim 1, wherein the generating a plurality of lightpath demand sequences with different orders from the lightpath demand set comprises:

obtaining the lightpath demand set by the a plurality of processing terminals;
generating, by the plurality of processing terminals, the plurality of lightpath demand sequences with different orders respectively from the lightpath demand set.

4. The method for optimizing the optical network according to claim 1, wherein the results of the respective lightpath demand sequences are obtained in parallel by a plurality of processing terminals on cloud computing platform.

5. The method for optimizing the optical network according to claim 4 comprising: applying Hadoop system to the method for optimizing the optical network.

6. The method for optimizing the optical network according to claim 5, wherein the applying Hadoop system to the method for optimizing optical network comprises:

obtaining the lightpath demand set including the plurality of lightpath demands by the Hadoop system in Map step;
generating the plurality of lightpath demand sequences with different orders from the lightpath demand set in Reduce step;
obtaining the results of the respective lightpath demand sequences in parallel by the plurality of processing terminals based on the Hadoop system;
collecting all the results, and comparing all the results to obtain the optimum results by the Hadoop system.

* * * * *